United States Patent [19]

Fishman

[11] Patent Number: 5,434,205
[45] Date of Patent: Jul. 18, 1995

[54] ACRYLONITRILE POLYMER COMPOSITIONS AND ARTICLES AND METHODS FOR THEIR PREPARATION

[75] Inventor: Norman Fishman, Menlo Park, Calif.

[73] Assignee: Solcas Polymer Limited Partnership, Walpole, Mass.

[21] Appl. No.: 102,040

[22] Filed: Aug. 4, 1993

Related U.S. Application Data

[63] Continuation-in-part of Ser. No. 822,288, Jan. 21, 1992, Pat. No. 5,304,590.

[51] Int. Cl.[6] .................. C08F 20/44; C08K 5/00
[52] U.S. Cl. .................... 524/235; 524/280; 524/566; 521/73; 521/74; 521/78; 521/79; 521/94; 521/97; 521/98; 521/149; 525/540; 526/329.3; 526/341; 264/81
[58] Field of Search .......... 524/235, 280, 566; 525/540; 521/73, 74, 78, 79, 94, 97, 98, 149; 264/81; 526/329.3, 341

[56] References Cited

U.S. PATENT DOCUMENTS

| | | | |
|---|---|---|---|
| 2,851,434 | 9/1958 | Jones et al. | 524/280 |
| 3,268,490 | 8/1966 | Sunden et al. | 260/78.5 |
| 3,380,949 | 4/1968 | Isley et al. | 260/30.4 |
| 3,437,717 | 4/1969 | Isley et al. | 260/881 |
| 3,940,405 | 2/1976 | Serad | 260/29.6 |
| 4,062,857 | 12/1977 | Kobashi et al. | 526/303 |
| 4,066,731 | 1/1978 | Hungerford et al. | 264/216 |
| 4,144,299 | 3/1979 | Inoue et al. | 264/558 |
| 4,172,065 | 10/1979 | Parkinson et al. | 260/29.6 |
| 4,226,817 | 10/1980 | Siegman | 264/39 |
| 4,301,112 | 11/1981 | Zwick | 264/564 |
| 4,536,365 | 8/1985 | Zwick | 264/558 |
| 4,683,261 | 7/1987 | Innoue et al. | 524/566 |
| 4,743,417 | 5/1988 | Bakkelunn | 264/45.1 |
| 4,943,618 | 2/1990 | Stoy et al. | 525/340 |

FOREIGN PATENT DOCUMENTS

| | | |
|---|---|---|
| 58-020176 | 6/1973 | Japan . |
| 55-065236 | 5/1980 | Japan . |
| 57-139512 | 8/1982 | Japan . |
| 58-036208 | 8/1983 | Japan . |
| 58-174433 | 10/1983 | Japan . |
| 61-275309 | 12/1986 | Japan . |
| 62-062909 | 3/1987 | Japan . |
| 62-078209 | 4/1987 | Japan . |
| 62-085012 | 4/1987 | Japan . |
| 63-145345 | 6/1988 | Japan . |
| 72757 | 2/1981 | Romania . |
| 71507 | 10/1982 | Romania . |
| 80053 | 11/1982 | Romania . |
| 83256 | 9/1984 | Romania . |
| 95683 | 10/1988 | Romania . |

OTHER PUBLICATIONS

Jul. 27, 1993 Search Report from PCT International Application No. PCT/US93/00508.

*Primary Examiner*—Paul R. Michl
*Assistant Examiner*—Olga Asinovsky
*Attorney, Agent, or Firm*—Burns, Doane, Swecker & Mathis

[57] ABSTRACT

A process for providing extrudable polyacrylonitrile compositions. Dry, particulate polyacrylonitrile having a moisture content of less than about 1.5 percent is mixed with a liquid plasticizer such as ethylene carbonate or propylene carbonate at a mixing temperature of about 140° C. to about 180° C. This process produces an extrudable polyacrylonitrileplasticizer composition which can be extruded to form film, fiber or other extruded or co-extruded products.

9 Claims, No Drawings

ACRYLONITRILE POLYMER COMPOSITIONS AND ARTICLES AND METHODS FOR THEIR PREPARATION

RELATED APPLICATION

This application is a continuation-in-part of U.S. patent application Ser. No. 07/822,288, filed Jan. 21, 1992 of Merz et al., now U.S. Pat. No. 5,304,590, which is incorporated in its entirety herein by reference.

FIELD OF THE INVENTION

This invention relates to compositions of acrylonitrile polymers, and the preparation of those compositions for use in the formation of films, fibers, co-extruded articles and other polyacrylonitrile products.

BACKGROUND OF THE INVENTION

In the above-referenced Merz et al. U.S. Pat. No. 5,304,590, methods are disclosed for compounding polyacrylonitrile with certain plasticizers such as ethylene carbonate and/or propylene carbonate to provide extrudable polyacrylonitrile compounds or compositions suitable for making films and other extruded products. While the methods disclosed in the Merz et al. disclosure are commercially attractive processes which provide extrudable polyacrylonitrile compositions, it is the objective of the present invention to provide yet further improved methods for providing melt extrudable polyacrylonitrile compositions.

SUMMARY OF THE INVENTION

This invention provides a method of preparing acrylonitrile polymers in extrudable form by mixing and fusing particulate acrylonitrile polymers with a liquid fugitive plasticizer agent wherein the method is characterized by providing an acrylonitrile polymer having a moisture content at or below about 2 percent by weight and by mixing, fusing and extruding the acrylonitrile polymer and the plasticizer all at a temperature between about 140° C. and about 180° C. The mixing and fusing produces the desired extrudable polymer composition which is suitable for melt extrusion to form pellets, films, fibers, shaped products, coextrusions, profile shapes, sheets and other products conventionally produced by employing an extrusion step. When desired, the extruded composition can be pellets, shaped products, profile shapes or other products which are later extruded (or re-extruded), blow molded, thermoformed or otherwise processed to form final desired products.

BRIEF DESCRIPTION OF THE INVENTION

The processes disclosed in the Merz et al. U.S. Pat. No. 5,304,590 referred to above and incorporated herein by reference comprise using a polyacrylonitrile containing about 5 to about 30 percent by weight water and blending therewith a fugitive plasticizer such as ethylene carbonate and/or propylene carbonate at a temperature in the range of about 54° C. After the plasticizer is blended with the moist polyacrylonitrile, the blend is then dried at temperatures up to about 60° C., preferably under vacuum, to lower the moisture content of the blend to about 0.5 percent by weight. The Merz et al. patent also discloses that the moisture content of the blend can be maintained at the elevated level in order to produce a foam product upon extrusion of the polyacrylonitrile composition. However, for production of film, fiber, etc., the moisture content of the plasticized polyacrylonitrile composition blend is lowered to the 0.5 percent range.

Applicant herein has now found that extrudable polyacrylonitrile compositions can be prepared with the desired plasticizer in the absence of significant moisture content. It has been found that by using a particulate polyacrylonitrile polymer having a moisture content of about 2 percent or less, preferably less than about 1.5 percent, more preferably less than about 1 percent and most preferably less than about 0.5 percent by weight water, and mixing the dry particulate polymer with the desired liquid fugitive plasticizer at a temperature in the range of between about 140° C. and about 180° C., whereby the plasticizer and the particulate polymer fuse at the elevated temperatures to form a uniform melt which is then extruded at the elevated temperature. It has been found that the processing of the polyacrylonitrile according to this invention at the elevated temperatures does not adversely affect the properties of the polyacrylonitrile. The extrudable polyacrylonitrile composition formed by this method can be used in the melt extrusion processes, such as disclosed in the Merz et al. patent. Also, as disclosed in the Merz et al. patent, polyacrylonitrile foams can be formed from the extrudable polyacrylonitrile compositions formed according to this invention by using an appropriate blowing agent as disclosed in the Merz et al. patent.

As used herein, "extrudable" means the polymer composition is directly extrudable as part of the mixing and fusing process described above and is re-extrudable later, such as where the initial extruded polymer composition of this invention is in the form of pellets, etc., which can be extruded, blow molded, coextruded, thermoformed and the like.

As used herein, the term "particulate polymer comprising polyacrylonitrile" is to be understood to include homopolymer polyacrylonitrile, copolymers of acrylonitrile, block copolymers, graft copolymers, etc., which contain a significant portion of acrylonitrile polymerized or copolymerized in the polymer system. Monomers which can be included in the polymers useful as chain extenders and cross-linking agents are polyalkenyl monomers having at least two vinyl groups per molecule, including butanediol-1,4-divinyl ether, divinyl benzene, and the like. Monomers which can be employed to form copolymers of acrylonitrile useful in this invention include acrylate esters, such as methyl acrylate, ethyl acrylate, butyl acrylate, and the like; and methacrylate esters such as methyl methacrylate, ethyl methacrylate, butyl methacrylate, and the like. The preferred polymers for use in this invention are acrylonitrile polymers which are 90 percent or more acrylonitrile monomer, preferably 95 percent or more, and more preferably at least 99 percent acrylonitrile monomer, i.e., any comonomer is present in amounts less than about 10 percent by weight.

The plasticizer employed in this invention is referred to as a "liquid fugitive plasticizer" because its function is to readily mix and fuse uniformly with the polyacrylonitrile, remain in the polymer melt during extrusion processing, then be capable of readily separating from the extruded product which is formed, such as film, sheet, web, fibrils and co-extruded layers or laminates with other polymers when desired. Such separation is accomplished by the elevated temperatures used throughout the product forming processes. It is believed that stretching to some extent also causes or assists in such separation. Preferred plasticizers useful in the polymers mentioned above include ethylene carbonate and propylene carbonate either alone or in combination with each other. Ethylene carbonate is preferred over propylene carbonate, but a mixture of the two is more preferred, e.g., in any proportions such as 10:90, 90:10, etc., but the most preferred being about a 50:50 mixture of the two.

The liquid fugitive plasticizer must be one which can be uniformly and completely fused with the particulate acrylonitrile polymer. Preferably, the plasticizer used is liquid but can be a solid, provided it is or becomes liquid at the processing temperatures for the mixing and fusing, according to this invention, and is liquid or vapor when it is separated from the final extruded polymer product. Thus, a solid or powdered plasticizer could be used as a feed to a mixer or compounding extruder used in carrying out the method of this invention, provided the plasticizer melts at the processing temperature.

Finally, the plasticizer should be readily separable when desired and to the desired degree from the final formed polymer product by heat treatment and/or mechanical treatment, such as disclosed herein and in the Merz et al. U.S. Pat. No. 5,304,590 incorporated herein by reference. Thus, the plasticizer should exude, liquify or volatilize at temperatures and conditions for processing and treatment of the formed polyacrylonitrile products.

One skilled in the art will be able to select appropriate liquid fugitive plasticizers for use in this invention based on the criteria described above and following the embodiments and examples disclosed herein.

The amount of plasticizer(s) used can generally range from about 20 percent to about 60 percent by weight based on the weight of the polymer (i.e., based on the combined weight of the polymer and plasticizer, excluding the weight of any other components present). Preferably, the plasticizer should be present in the amount of about 30 percent to about 50 percent, and most preferably between about 35 percent and about 45 percent. It has been found that by using ethylene carbonate or propylene carbonate, a wide range of polymer melt viscosities can be obtained by small adjustments of the amount of plasticizer within the preferred 35 to 45 percent range.

The temperature at which the method of this invention is carried out is between about 140° C. and about 180° C., and is preferably between about 160° C. and about 175° C. with temperatures in the range of about 170° C. to about 175° C. being most preferred. Mixing times will be apparent to one skilled in the art, but in general will be less than about 10 minutes, depending on the efficiency of the mixing equipment used. In any case, sufficient time must be allowed for the intimate mixing and the fusing of the polymer and the plasticizer to form the extrudable polyacrylonitrile composition according to this invention. In this regard, it should be noted that the equipment used should be capable of strong mixing to accomplish the necessary intimate mixing and the fusing of the polymer and plasticizer. A simple low energy blending may not be sufficient, so a moderate to strong shear mixer should be used. A preferred apparatus is a conventional compounder-extruder.

Having illustrated the present invention, other more general aspects and some more particular aspects of this invention can now be described.

Polymers useful in this invention include acrylonitrile polymers comprising 90 weight percent or more acrylonitrile monomer polymerized with a polyalkenyl monomer having at least two vinyl groups per molecule. In a preliminary step, it is desirable to render such polymers substantially free of unpolymerized acrylonitrile monomer by separating such polymer product from the polymerizing solution and subsequent washing solutions which may contain stabilizing agents and other agents, such as antioxidants. These separations should be at low temperatures. The removal of substantially all moisture from the polymer product enables the fusion of the dry polymer with the liquid fugitive plasticizer in a mixer or in a compounding extruder to extrude dry, uniform pellets which can be re-extruded into shaped articles such as thin films, co-extrusions with other polymers, blow molded parts, foam and fibers. Of course, the mixing and fusing process can be immediately followed by direct feed to forming dies for the final extruded product, such as film, shaped article, etc.

A preferred acrylonitrile polymer for use in the present process is a polymer composed of 99.6 weight percent of acrylonitrile monomer polymerized with 0.4 weight percent polyalkenyl monomer having at least two vinyl groups per molecule, as more fully described in U.S. Pat. No. 3,437,717, to Isley et al. to provide a polymer having a molecular weight of from 80,000 to 100,000. Similarly, the acrylonitrile polymers produced as described in U.S. Pat. No. 3,268,490 to Sunden et al. are among the most preferred acrylonitrile polymers used in the present invention. These preferred polymers are produced by methods which polymerize primarily by chain extension. These polymers are also known as "star" configuration polymers in which polymerization is by chain extension from a "seed" nucleus. The term "star" configuration refers to a molecular morphology that results from chains growing outward in several directions from a nucleus, in this case formed by copolymerization of acrylonitrile monomer with the polyalkenyl monomer having at least two vinyl groups per molecule. This preferred type of polymer for use in the present invention is referred to as a chain extension polymer having a low degree of cross-linking. It is apparent from the prior art that these preferred polymers can be produced in particulate form. The present invention is equally effective for copolymers, block copolymers and graft copolymers of acrylonitrile.

Polymerization of acrylonitrile is carried out in an aqueous medium under a nitrogen blanket in a straight forward manner as by emulsion or suspension means well-known to those skilled in the art, in the presence of an emulsifier and a redox catalyst. Polymerization can be accomplished either in the batch or continuous mode. All of the polyalkenyl monomer can be added to the polymerizing agents, but the first addition of acrylonitrile monomer is carried out as a "seed step", wherein up to about 2 weight percent of the total acrylonitrile monomer is first copolymerized with the polyalkenyl monomer, followed by addition of the remainder of the acrylonitrile monomer in a continuous manner, incrementally or all at once. High conversion rates of polymer are normal in such reactions. This type of polymer preparation produces "chain-extended" polymers having a low degree of cross-linking. Polymerization of such polymers is described more fully in U.S. Pat. No. 3,380,949 to Isley et al. The disclosures of the above three patents are incorporated herein by reference.

It should be noted that in the above referenced Isley et al. and Sunden et al. patents, various polyalkenyl monomers are disclosed for use in the polymerization of acrylonitrile, such as butanediol-1, 4-divinylether, divinyl benzene and the like.

The particulate product of polymerization is isolated and collected by filtration, centrifugation, spray drying or other suitable low temperature means. For use in the present invention, it is essential to wash such polymers in a series of aqueous baths to remove all polymerizing agents by means well-known to those skilled in the art, and it is desirable to also remove unpolymerized acrylonitrile monomer to levels below 0.1 parts per million to meet regulatory requirements. Such particulate polymers have a surface area in the range of 10 to 50 square meters per gram, thus they are extremely porous and moisture absorptive. It is therefore also essential that the final rinse solution contain an antioxidant compound to stabilize such polymers by correcting possible defects introduced into the polymers such as ketonitrile groups formed by oxygen attack of the polymer backbone chains, or by nitrile group hydrolysis during polymerization. It is further essential that the polymer be dried to a moisture content of about 2 percent or less, preferably about 1 percent, and most preferably about 0.5 percent. Polymers of higher moisture content can be employed provided the moisture content is lowered to the desired level before mixing and fusing the polymer with the plasticizer, e.g., through pulling the excess water out through a vacuum port in an extruder upstream of the addition of the plasticizer.

Fusion of the particulate polymers with plasticizing agents embodied herein may be carried out in various types of mixing equipment. A preferred means for mixing is a conventional compounding extruder having appropriate inlet ports for the particulate polymer and liquid plasticizer. It is also sometimes useful to also have a vacuum port to remove any residual volatiles, or excess water if desired.

Desirable additives, such as ultraviolet inhibitors, coloring agents, flame retardants and the like, can also be added during the procedures in which the polymer is mixed and fused with the plasticizing agents. The additives can be added to the polymer, to the plasticizer or to the mix, as appropriate. For example, a solid or powdered additive can be added to the powdered polymer fed to the mixer, a liquid additive can be added to the liquid plasticizer fed to the mixer, or an additive can be injected separately into the mix, e.g., at a separate feed port on a compounding extruder.

It has also been found that the acrylonitrile polymers and copolymers of this invention can be provided with reduced thermal sensitivity by the addition of alkyl substituted N-maleimides or stilbene derivatives. This reduced thermal sensitivity enables the processing of the polymer without premature increase in molecular weight.

The extrudable polyacrylonitrile compositions formed according to the present invention are useful in the same extrusion processes as disclosed in the Merz et al. patent referred to above and incorporated herein by reference for the production of film, fibers and other extrudable, blow moldable or thermoformable products.

The following examples illustrate the method of this invention.

EXAMPLE 1

In this Example, the polyacrylonitrile and the plasticizer were mixed and fused in a Haake Rheocord Torque Rheometer, System 40, Model 600, Rheomix, fitted with Sigma blades and operated at 125 RPM and at 170° C. The plasticizer was introduced into the mixer first, followed by the stabilizer, and then by slow addition of the polymer. Mixing time is the time between when all of the polymer had been added and when the mixing was stopped. The following were used.

- 30 grams—50/50 mixture of ethylene carbonate/propylene carbonate.
- 0.45 grams U875A (a blended antioxidant and sulphite stabilizer available from General Electric under the "Ultranox" name).
- 45 grams polyacrylonitrile of the extended chain type described for use in this invention and having a molecular weight of about 130,000 (a 99 percent polyacrylonitrile produced by ICAP, an Italian chemical company).

After all of the polymer was added to the mixture, the mixer was run for six minutes, and the temperature maintained throughout at 170° C. The beginning torque (Gm/Nm) was 270 and the end torque was 200. The fused polymer and plasticizer had a light color and was pressed into a sheet at 150° C., about 12 to 16 mills in thickness. The resulting sheet showed good consolidation and uniform appearance.

EXAMPLE 2

Example 1 was repeated with 33 grams of the same plasticizer, 0.7 grams of the same stabilizer and 42 grams of the same polymer. Mixing time was 3 minutes at 175° C. The beginning torque was 160 and the ending torque 145. The resulting product was light in color and a sheet pressed at 140° C. showed good consolidation and uniform appearance.

EXAMPLE 3

This Example illustrates the use of compounding extruder for carrying out the method of this invention. A Buss Kneader-Extruder BKE Moxel MDK, available from Buss (America) Inc., is used.

The particulate, dried polymer is first blended with an appropriate amount of a selected, particulate thermal stabilizer (e.g., about 1 percent by weight of General Electric Ultranox 875A). The polymer-stabilizer blend is then fed through a feed port into the mixing section of a compounder-extruder as the liquid fugitive plasticizer, a 50/50 mixture of ethylene carbonate and propylene carbonate, is fed through another adjacent feed port. Both solid and liquid feed streams are metered through gravimetric or positive displacement feeders to provide their relative feed weight ratio of about 45 parts plasticizer and about 55 parts polymer being fed to the compounder-extruder. The compounder-extruder is maintained at 170° C.

The polymer and plasticizer are intimately mixed in the mixer section of the compounder-extruder, then the mixture of polymer and plasticizer traverses next into the compounding section of the compounder-extruder in which fusion of the polymer and plasticizer occurs. The fused composition is then forced through the final section of the extruder into and through a slot die to form sheet web as a precursor for film production. The sheet is suitable for a heating/stretching process to form a final barrier film and to remove the liquid fugitive plasticizer from the film.

What is claimed is:

1. A method of making an extrudable polymer composition comprising polyacrylonitrile comprising:
   (a) providing a free-flowing particulate polymer comprising polyacrylonitrile having a water content between about 0 percent and about 2 percent by weight;
   (b) providing a liquid fugitive plasticizer, and
   (c) mixing and fusing the particulate polymer and the plasticizer and fusing and extruding the fused mixture all at a temperature between about 140° C. and about 180° C.

2. A method according to claim 1 wherein the polyacrylonitrile polymer comprises a chain-extended polymer having a molecular weight less than about 100,000 and having a low degree of cross-linking.

3. A method according to claim 1 wherein the fugitive plasticizer comprises ethylene carbonate, propylene carbonate or mixtures thereof.

4. A method according to claim 3 wherein the fugitive plasticizer comprises ethylene carbonate.

5. A method according to claim 3 wherein the fugitive plasticizer comprises propylene carbonate.

6. A method according to claim 3 wherein the fugitive plasticizer comprises about 50:50 by weight ethylene carbonate:propylene carbonate.

7. A method according to claim 3 wherein the extruding comprises:
   extruding the fused polymer composition to form film, fiber, pellets or shaped articles.

8. A method according to claim 3 wherein the extruding comprising:
   extruding a profile shape which is suitable for being thermoformed into shaped articles.

9. A method according to claim 3 further comprises:
   blow molding the extruded fused polymer composition to produce shaped articles.

* * * * *